United States Patent
Guironnet et al.

(10) Patent No.: US 10,414,903 B2
(45) Date of Patent: Sep. 17, 2019

(54) METHODS FOR SYNTHESIS OF END-FUNCTIONALIZED POLYOLEFINS

(71) Applicant: The Board of Trustees of the University of Illinois, Urbana, IL (US)

(72) Inventors: Damien S. Guironnet, Urbana, IL (US); Michael G. Hyatt, Savoy, IL (US); Dylan J. Walsh, Sun Prairie, WI (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 112 days.

(21) Appl. No.: 15/809,568

(22) Filed: Nov. 10, 2017

(65) Prior Publication Data
US 2018/0134873 A1 May 17, 2018

Related U.S. Application Data

(60) Provisional application No. 62/420,819, filed on Nov. 11, 2016.

(51) Int. Cl.
*C08K 5/541* (2006.01)
*C08K 5/54* (2006.01)
(Continued)

(52) U.S. Cl.
CPC ............... *C08K 5/541* (2013.01); *C08F 4/80* (2013.01); *C08F 10/02* (2013.01); *C08F 20/06* (2013.01);
(Continued)

(58) Field of Classification Search
USPC ........................................ 526/171, 172, 194
See application file for complete search history.

(56) References Cited

U.S. PATENT DOCUMENTS 5,578,690 A * 11/1996 Marks ..................... C08F 10/00
526/126
6,372,869 B1 * 4/2002 Arthur .................... C08F 10/00
526/126
(Continued)

FOREIGN PATENT DOCUMENTS

CN 102206307 A 10/2011
CN 103102433 B 12/2014

OTHER PUBLICATIONS

Chen et al., "Mechanistic Studies of Pd(II)-Catalyzed Copolymerization of Ethylene and Vinylalkoxysilanes: Evidence for a β-Silyl Elimination Chain Transfer Mechanism," J Am Chem Soc., 138(49):16120-16129, Dec. 2016.
(Continued)

*Primary Examiner* — Fred M Teskin
(74) *Attorney, Agent, or Firm* — Haukaas Fortius PLLC; Michael H. Haukaas

(57) ABSTRACT

A strategy for the synthesis of semi-telechelic polyethylene through the palladium diimine-catalyzed chain transfer polymerization of ethylene using various silanes as chain transfer agents is reported. Polymer molecular weight and end-group chemical structure can be tuned by varying the chain transfer agent as well as its concentration. NMR spectroscopy confirms that the silicon of the chain transfer agent is incorporated into the polymer. The stability of the catalyst toward polar monomer enables the chain transfer polymerization of semi-telechelic poly(ethylene-methyl acrylate) copolymers.

20 Claims, 3 Drawing Sheets

(51) Int. Cl.
*C08F 10/02* (2006.01)
*C08F 20/06* (2006.01)
*C08F 4/80* (2006.01)
*C08F 110/02* (2006.01)
*C08F 110/06* (2006.01)
*C08F 293/00* (2006.01)
*C08G 81/02* (2006.01)
*C08G 83/00* (2006.01)

(52) U.S. Cl.
CPC .......... *C08F 110/02* (2013.01); *C08F 110/06* (2013.01); *C08F 293/005* (2013.01); *C08G 81/027* (2013.01); *C08G 83/003* (2013.01); *C08G 83/005* (2013.01); *C08K 5/5403* (2013.01); *C08F 2438/00* (2013.01); *C08F 2438/01* (2013.01); *C08F 2810/40* (2013.01)

(56) References Cited

U.S. PATENT DOCUMENTS 7,863,394 B2   1/2011   Rhodes et al.

2015/0038647 A1   2/2015   Boisson et al.
2015/0080536 A1   3/2015   Diao et al.

OTHER PUBLICATIONS

Gottfried et al., "Living Polymerization of Ethylene Using Pd(II) r-Diimine Catalysts," Macromolecules, 34(5):1140-1142, Jan. 2001.

Lapointe et al., "Mechanistic Studies of Palladium(II)-Catalyzed Hydrosilation and Dehydrogenative Silation Reactions," J. Am Chem Soc., 119(5):906-917, Feb. 1997.

Pappas et al., "Alkene Hydrosilylation Using Tertiary Silanes with α-Diimine Nickel Catalysts. Redox-Active Ligands Promote a Distinct Mechanistic Pathway from Platinum Catalysts." ACS Catal., 6(7):4105-4109, May 2016.

Srinivas et al., "(Salicylaldiminato)Ni(II)-catalysts for Hydrosilylation of Olefins ." Catal. Sci. Technol., 5:2081-2084, Mar. 2015.

Widenhoefer, R.A., "Synthetic and Mechanistic Studies of the Cycloisomerization and Cyclization/Hydrosilylation of Functionalized Dienes Catalyzed by Cationic Palladium(II) Complexes," Acc. Chem. Res., 35(10):905-913, Oct. 2002.

* cited by examiner

METHODS FOR SYNTHESIS OF END-FUNCTIONALIZED POLYOLEFINS

RELATED APPLICATIONS

This application claims priority under 35 U.S.C. § 119(e) to U.S. Provisional Patent Application No. 62/420,819, filed Nov. 11, 2016, which is incorporated herein by reference.

BACKGROUND OF THE INVENTION

As more than 50% of the world polymer production consists of polyolefins, increasing the molecular precision of polyolefin synthesis has the potential to directly improve the physical and mechanical properties of most of the objects surrounding us. Telechelic and semi-telechelic polymers, polymers with one and two functional end-groups, can be used as building blocks for the synthesis of such advanced polymers (FIG. 1). Telechelic polymers are most commonly synthesized by living radical or living anionic polymerizations. These polymerization methods, however, are not compatible with simple olefins and therefore telechelic polyolefins require alternative strategies to access directly.

Different approaches have been reported for the synthesis of telechelic polyolefins. The selective quenching of the anionic polymerization of butadiene with a capping agent (e.g. oxygen, carbon dioxide or epoxide) followed by the hydrogenation of the polymer to yield telechelic polyethylenes (Pes) remains the most common technique. The ring opening metathesis polymerization of cyclic olefins in presence of a chain transfer agent also results in telechelic polyolefins. While very elegant, these approaches do not employ the widely available ethylene and propylene monomers. Mecking et al. (*Angew. Chemie Int. Ed.* 2016, 55, 14378) recently reported the direct synthesis of telechelic polyethylene by copolymerization of 2-vinylfuran with ethylene. The unique reactivity of the catalyst toward the comonomer enables the exclusive formation of polyethylene with di-furan end-groups.

The living catalytic polymerization of olefin has been reported to yield semi-telechelic polyolefins. The main drawback of this approach, however, is that each molecule of catalyst yields only one polymer chain. Chain transfer polymerization (CTP) offers a viable solution to this issue. Indeed in a CTP, the use of a chain transfer agent (CTA) results in the formation of multiple polymer chains per catalyst, with the CTA being incorporated as one of the end groups. For example, lanthanide based catalysts have been reported to catalyze the chain transfer polymerizations of ethylene with electron rich CTA such as amines and phosphines to yield the corresponding amine and phosphine-terminated polyethylenes. Electron poor CTAs such as boranes, silanes and alanes have also been successfully incorporated into the terminus of polyethylenes.

Most of the examples of CTP involving olefins rely on oxophilic catalysts (early transition metal and rare earth metal complexes). The oxophilicity of these catalysts severely limits the scope of functional groups that one can introduce at the end of a polyolefin. In fact, thus far, linear semi-telechelic polyolefins produced by CTP have been reported to include at most one heteroatom per chain. Accordingly, there is a need for an alternative method to prepare end-functionalized polyolefins.

SUMMARY

This disclosure reports the first example of a palladium-catalyzed chain transfer polymerization of ethylene with tertiary silanes as CTA using the palladium (II) diimine catalyst 1 (FIG. 1). The tolerance of palladium (II) diimine catalysts towards functional groups enables the synthesis of hyperbranched polyethylene with a wide array of functionality. CTP with other late transition metal-based catalysts (Ni, Fe and Co) have been reported using zinc and aluminum alkyls as chain transfer agents. While the metal employed for these catalysts is less electronegative, the oxophilicity of the CTAs limits the diversity of functional groups that can be introduced as polymer end-groups.

Accordingly, this disclosure provides a method for preparing an end-functionalized polyolefin by a chain transfer polymerization (CTP) comprising:

combining a tertiary silane chain transfer agent (CTA) of formula $HSiR_3$, a late transition metal catalyst, and an olefin, to provide a reaction mixture;

wherein each R of the CTA is independently an organic moiety, the late transition metal catalyst is substantially non-oxyphilic, the olefin comprises an optional functional group; and the rate of the CTP is regulated by the substituents on the CTA, the degree of polymerization (DP) is regulated by the concentration of the CTA in the reaction mixture, and the reaction mixture provides an end-functionalized polyolefin having an end group comprising a silane moiety of formula $—SiR_3$.

In various embodiments of this method, each substituent R of the silane moiety at one end of the prepared semitelechelic or the heterotelechelic polymer is independently an alkyl, branched alkyl, unsaturated alkyl, cycloalkyl, alkoxy, hydroxy, aryl, heteroaryl, aryloxy, heteroarlyoxy, an oligomer, or polymer, wherein an aryl or heteroaryl moiety is optionally substituted with one or more substituents, and an aryl or heteroaryl moiety is optionally a fused polyaromatic or fused polyheteroaromatic.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
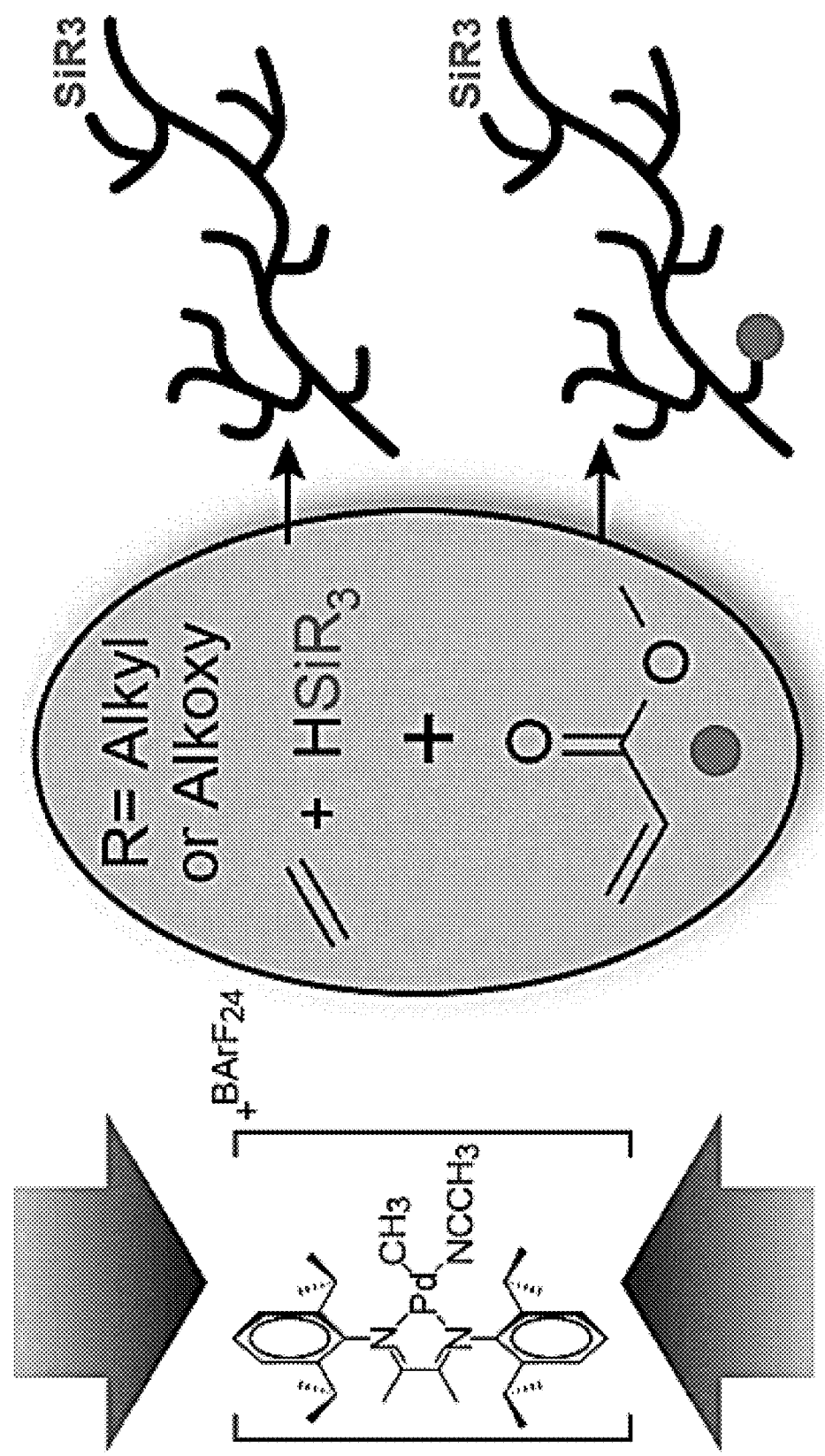
FIG. 1. General representation for the preparation of semitelechelic and heterotelechelic polymers by a tertiary silane chain transfer agent and a late transition metal catalyst.

Controlling the molecular structure of polymers is a challenge in the field of polymer science. The disclosed chain transfer polymerization technique provides two significant advances in the art. First, a fast chain transfer reaction permits fine control of the degree of polymerization, affecting the molecular weight of the polymer formed, and the functionality of at least one end of the polymer. Second, the chain transfer reaction is near quantitative: That is, the chain transfer agents is almost completely incorporated into the polymer.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

In general, "substituted" or the term "functional group" refers to an organic group or organic moiety as defined herein in which one or more bonds to a hydrogen atom contained therein are replaced by one or more bonds to a non-hydrogen atom such as, but not limited to, a halogen (i.e., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboyxlate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR', OC(O)N(R')$_2$, CN, CF$_3$, OCF$_3$, R', O, S, C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$NHC(O)R', N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted. When a substituent is monovalent, such as, for example, F or Cl, it is bonded to the atom it is substituting by a single bond. When a substituent is more than monovalent, such as O, which is divalent, it can be bonded to the atom it is substituting by more than one bond, i.e., a divalent substituent is bonded by a double bond; for example, a C substituted with O forms a carbonyl group, C=O, wherein the C and the O are double bonded. Alternatively, a divalent substituent such as O, S, C(O), S(O), or S(O)$_2$ can be connected by two single bonds to two different carbon atoms. For example, O, a divalent substituent, can be bonded to each of two adjacent carbon atoms to provide an epoxide group, or the O can form a bridging ether group between adjacent or non-adjacent carbon atoms, for example bridging the 1,4-carbons of a cyclohexyl group to form a [2.2.1]-oxabicyclo system. Further, any substituent can be bonded to a carbon or other atom by a linker, such as (CH$_2$)$_n$ or (CR'$_2$)$_n$ wherein n is 1, 2, 3, or more, and each R' is independently selected.

The term "end group" refers to a particular type of substituent, functional group, organic group or organic moiety that is at or substantially at the distal end or tail end of the polymer (FIG. 1). The end group may also be at both ends of the polymer.

Substituted alkyl, alkenyl, alkynyl, cycloalkyl, and cycloalkenyl groups as well as other substituted groups also include groups in which one or more bonds to a hydrogen atom are replaced by one or more bonds, including double or triple bonds, to a carbon atom, or to a heteroatom such as, but not limited to, oxygen in carbonyl (oxo), carboxyl, ester, amide, imide, urethane, and urea groups; and nitrogen in imines, hydroxyimines, oximes, hydrazones, amidines, guanidines, and nitriles.

Substituted ring groups such as substituted cycloalkyl, aryl, heterocyclyl and heteroaryl groups also include rings and fused ring systems in which a bond to a hydrogen atom is replaced with a bond to a carbon atom. Therefore, substituted cycloalkyl, aryl, heterocyclyl and heteroaryl groups can also be substituted with alkyl, alkenyl, and alkynyl groups as defined herein.

By a "ring system" as the term is used herein is meant a moiety comprising one, two, three or more rings, which can be substituted with non-ring groups or with other ring systems, or both, which can be fully saturated, partially unsaturated, fully unsaturated, or aromatic, and when the ring system includes more than a single ring, the rings can be fused, bridging, or spirocyclic. By "spirocyclic" is meant the class of structures wherein two rings are fused at a single tetrahedral carbon atom, as is well known in the art.

Alkyl groups include straight chain and branched alkyl groups and cycloalkyl groups having from 1 to about 20 carbon atoms, and typically from 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. Representative substituted alkyl groups can be substituted one or more times with any of the groups listed above, for example, amino, hydroxy, cyano, carboxy, nitro, thio, alkoxy, and halogen groups.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The terms "carbocyclic" and "carbocycle" denote a ring structure wherein the atoms of the ring are carbon. In some embodiments, the carbocycle has 3 to 8 ring members, whereas in other embodiments the number of ring carbon atoms is 4, 5, 6, or 7. Unless specifically indicated to the contrary, the carbocyclic ring can be substituted with as many as N−1 substituents wherein N is the size of the carbocyclic ring with, for example, alkyl, alkenyl, alkynyl, amino, aryl, hydroxy, cyano, carboxy, heteroaryl, heterocyclyl, nitro, thio, alkoxy, and halogen groups, or other groups as are listed above.

(Cycloalkyl)alkyl groups, also denoted cycloalkylalkyl, are alkyl groups as defined above in which a hydrogen or carbon bond of the alkyl group is replaced with a bond to a cycloalkyl group as defined above.

Alkenyl groups include straight and branched chain and cyclic alkyl groups as defined above, except that at least one double bond exists between two carbon atoms. Thus, alkenyl groups have from 2 to about 20 carbon atoms, and typically from 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

Cycloalkenyl groups include cycloalkyl groups having at least one double bond between 2 carbons. Thus, for example, cycloalkenyl groups include but are not limited to cyclohexenyl, cyclopentenyl, and cyclohexadienyl groups. Cycloalkenyl groups can have from 3 to about 8-12 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like, provided they include at least one double bond within a ring. Cycloalkenyl groups also include rings that are substituted with straight or branched chain alkyl groups as defined above.

(Cycloalkenyl)alkyl groups are alkyl groups as defined above in which a hydrogen or carbon bond of the alkyl group is replaced with a bond to a cycloalkenyl group as defined above.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

Aryl groups are cyclic aromatic hydrocarbons that do not contain heteroatoms. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined above. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed above.

Aralkyl groups are alkyl groups as defined above in which a hydrogen or carbon bond of an alkyl group is replaced with a bond to an aryl group as defined above. Representative aralkyl groups include benzyl and phenylethyl groups and fused (cycloalkylaryl)alkyl groups such as 4-ethyl-indanyl. Aralkenyl group are alkenyl groups as defined above in which a hydrogen or carbon bond of an alkyl group is replaced with a bond to an aryl group as defined above.

Heterocyclyl groups include aromatic and non-aromatic ring compounds containing 3 or more ring members, of which, one or more is a heteroatom such as, but not limited to, N, O, and S. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise, a C$_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those comprising fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed above. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed above.

Heteroaryl groups are aromatic ring compounds containing 5 or more ring members, of which, one or more is a heteroatom such as, but not limited to, N, O, and S; for instance, heteroaryl rings can have 5 to about 8-12 ring members. A heteroaryl group designated as a C$_2$-heteroaryl can be a 5-ring with two carbon atoms and three heteroatoms, a 6-ring with two carbon atoms and four heteroatoms and so forth. Likewise, a C$_4$-heteroaryl can be a 5-ring with one heteroatom, a 6-ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed above. Representative substituted heteroaryl groups can be substituted one or more times with groups such as those listed above.

Additional examples of aryl and heteroaryl groups include but are not limited to phenyl, biphenyl, indenyl, naphthyl (1-naphthyl, 2-naphthyl), N-hydroxytetrazolyl, N-hydroxytriazolyl, N-hydroxyimidazolyl, anthracenyl (1-anthracenyl, 2-anthracenyl, 3-anthracenyl), thiophenyl (2-thienyl, 3-thienyl), furyl (2-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl (3-pyrazolyl), imidazolyl (1-imidazolyl, 2-imidazolyl, 4-imidazolyl, 5-imidazolyl), triazolyl (1,2,3-triazol-1-yl, 1,2,3-triazol-2-yl 1,2,3-triazol-4-yl, 1,2,4-triazol-3-yl), oxazolyl (2-oxazolyl, 4-oxazolyl, 5-oxazolyl), thiazolyl (2-thiazolyl, 4-thiazolyl, 5-thiazolyl), pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl (3-pyridazinyl, 4-pyridazinyl, 5-pyridazinyl), quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]furanyl (2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl (2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl (2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl), 5-(2,3-dihydro-benzo[b]thiophenyl), 6-(2,3-dihydro-benzo[b]thiophenyl), 7-(2,3-dihydro-benzo[b]thiophenyl), indolyl (1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl (1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl (1-benzothiazolyl, 2-benzothiazolyl, 4-benzothiazolyl, 5-benzothiazolyl, 6-benzothiazolyl, 7-benzothiazolyl), carbazolyl (1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl), 10,11-dihydro-5H-dibenz[b,f]azepine (10,11-dihydro-5H-dibenz[b,f]azepine-1-yl, 10,11-dihydro-5H-dibenz[b,f]azepine-2-yl, 10,11-dihydro-5H-dibenz[b,f]azepine-3-yl, 10,11-dihydro-5H-dibenz[b,f]azepine-4-yl, 10,11-dihydro-5H-dibenz[b,f]azepine-5-yl), and the like.

Heterocyclylalkyl groups are alkyl groups as defined above in which a hydrogen or carbon bond of an alkyl group as defined above is replaced with a bond to a heterocyclyl group as defined above. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

Heteroarylalkyl groups are alkyl groups as defined above in which a hydrogen or carbon bond of an alkyl group is replaced with a bond to a heteroaryl group as defined above.

The term "alkoxy" refers to an oxygen atom connected to an alkyl group, including a cycloalkyl group, as are defined above. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein.

Any of the substituents disclosed herein may be considered as a functional group. The CTA may have up to 3 different functional groups, the olefin monomer may have at least one functional group and the polymer may have at least on functional group. The terms below are some particular examples of functional groups.

"Halo" as the term is used herein includes fluoro, chloro, bromo, and iodo. A "haloalkyl" group includes mono-halo alkyl groups, and poly-halo alkyl groups wherein all halo atoms can be the same or different. Examples of haloalkyl include trifluoromethyl, 1,1-dichloroethyl, 1,2-dichloroethyl, 1,3-dibromo-3,3-difluoropropyl and the like.

The terms "aryloxy" and "arylalkoxy" refer to, respectively, an aryl group bonded to an oxygen atom and an aralkyl group bonded to the oxygen atom at the alkyl moeity. Examples include but are not limited to phenoxy, naphthyloxy, and benzyloxy.

An "acyl" group as the term is used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein, the carbonyl carbon atom is bonded to a hydrogen, the group is a "formyl" group, an acyl group as the term is defined herein. An acyl group can include 0 to about 12-20 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "amine" includes primary, secondary, and tertiary amines having, e.g., the formula $N(group)_3$ wherein each group can independently be H or non-H, such as alkyl, aryl, and the like. Amines include but are not limited to $R-NH_2$, for example, alkylamines, arylamines, alkylarylamines; $R_2NH$ wherein each R is independently selected, such as dialkylamines, diarylamines, aralkylamines, heterocyclylamines and the like; and R3N wherein each R is independently selected, such as trialkylamines, dialkylarylamines, alkyldiarylamines, triarylamines, and the like. The term "amine" also includes ammonium ions as used herein. An "amino" group is a substituent of the form $-NH_2$, $-NHR$, $-NR_2$, $-NR_3^+$, wherein each R is independently selected, and protonated forms of each. Accordingly, any compound substituted with an amino group can be viewed as an amine.

An "ammonium" ion includes the unsubstituted ammonium ion $NH_4^+$, but unless otherwise specified, it also includes any protonated or quaternarized forms of amines. Thus, trimethylammonium hydrochloride and tetramethylammonium chloride are both ammonium ions, and amines, within the meaning herein.

The term "amide" (or "amido") includes C- and N-amide groups, i.e., $-C(O)NR_2$, and $-NRC(O)R$ groups, respectively. Amide groups therefore include but are not limited to carbamoyl groups ($-C(O)NH_2$) and formamide groups ($-NHC(O)H$). A "carboxamido" group is a group of the formula $C(O)NR_2$, wherein R can be H, alkyl, aryl, etc.

The term "urethane" (or "carbamyl") includes N- and O-urethane groups, i.e., $-NRC(O)OR$ and $-OC(O)NR_2$ groups, respectively.

The term "sulfonamide" (or "sulfonamido") includes S- and N-sulfonamide groups, i.e., —$SO_2NR_2$ and —$NRSO_2R$ groups, respectively. Sulfonamide groups therefore include but are not limited to sulfamoyl groups (—$SO_2NH_2$). An organosulfur structure represented by the formula —S(O)(NR)— is understood to refer to a sulfoximine, wherein both the oxygen and the nitrogen atoms are bonded to the sulfur atom, which is also bonded to two carbon atoms.

The term "amidine" or "amidino" includes groups of the formula —$C(NR)NR_2$. Typically, an amidino group is —$C(NH)NH_2$.

The term "guanidine" or "guanidino" includes groups of the formula —$NRC(NR)NR_2$. Typically, a guanidino group is —$NHC(NH)NH_2$.

Recursive substituents are an intended aspect of the invention. One of ordinary skill in the art of polymer and organic chemistry understands the versatility of such substituents.

Embodiments of the Invention

This disclosure and its various embodiments disclose a method for preparing an end-functionalized polyolefin by a chain transfer polymerization (CTP) comprising:
combining a tertiary silane chain transfer agent (CTA) of formula $HSiR_3$, a late transition metal catalyst, and an olefin, to provide a reaction mixture;
wherein each R of the CTA is independently an organic moiety, the late transition metal catalyst is substantially non-oxyphilic, the olefin comprises an optional functional group; and
the rate of the CTP is regulated by the substituents on the CTA, the degree of polymerization (DP) is regulated by the concentration of the CTA in the reaction mixture, and the reaction mixture provides an end-functionalized polyolefin having an end group comprising a silane moiety of formula —$SiR_3$.

The disclosure also provides embodiments of various functional groups. Examples of functional groups are described in the section under definitions.

In various embodiments, the end-functionalized polyolefin is a semitelechelic or a heterotelechelic polymer has a number average molar mass ($M_n$) and a dispersity (D stroke or Đ) that is modulated by the substituents on the CTA and the initial concentration of the CTA in the reaction mixture.

In various additional embodiments, each substituent R of the silane moiety at one end of the prepared semitelechelic or the heterotelechelic polymer is independently an alkyl, branched alkyl, unsaturated alkyl, cycloalkyl, alkoxy, hydroxy, aryl, heteroaryl, aryloxy, heteroarlyoxy, an oligomer, or polymer, wherein an aryl or heteroaryl moiety is optionally substituted with one or more substituents, and an aryl or heteroaryl moiety is optionally a fused polyaromatic or fused polyheteroaromatic.

In various other additional embodiments, each substituent R of the silane moiety is independently ($C_1$-$C_{10}$)alkyl, O($C_1$-$C_{10}$)alkyl, ($C_3$-$C_8$)cycloalkyl, O($C_3$-$C_8$)cycloalkyl, aryl, O(aryl), heteroaryl, or O(heteroaryl), wherein each aryl or heteroaryl moiety is optionally substituted with one or more of halo, hydroxy, amino, amide, hydrazino, carboxyl, carbonyl, cyano, nitro, alkyl, aryl, or heteroaryl. In additional embodiments of this disclosure, an aryl or heteroaryl moiety can be optionally substituted with up to five of the said substituents, up to four of the said substituents, up to three of the said substituents, up to two of the said substituents, one said substituent, 1-5 said substituents, 1-4, 1-3, or 1-2 said substituents.

In some various embodiments, each substituent R of the silane moiety is independently O($C_1$-$C_{10}$)alkyl, O($C_3$-$C_8$)cycloalkyl, O(aryl), or O(heteroaryl), wherein R is optionally a dye or fluorescent. In some other various embodiments, each substituent R of the silane moiety is independently ($C_1$-$C_{10}$)alkyl, ($C_3$-$C_8$)cycloalkyl, aryl, or heteroaryl, wherein R is optionally a dye or fluorescent. In yet other various embodiments, each substituent R of the silane moiety is independently aryl, or heteroaryl. In additional embodiments, each substituent R of the silane moiety is independently methyl, ethyl, isopropyl, cyclopropyl, phenyl, tolyl, methoxy, ethoxy, isopropoxy, butoxy, or phenoxy.

In various other embodiments, the late transition metal catalyst comprises palladium, nickel, or cobalt. In additional embodiments, the late transition metal catalyst comprises a monodentate ligand or a bidentate ligand. In yet other embodiments, the late transition metal catalyst comprises a diimine, a phosphine sulfonate, or a phenanthroline ligand.

In additional embodiments, the olefin comprises an organic functional group, such as the examples disclosed above. In other embodiments, the functional group comprises a CN, —C—O—C—, —C(=O)C—, or —C(=O)OC— moiety. In yet other embodiments, the olefin is ethylene or an acrylate, such as for example, 1-((2-bromo-2-methylpropanoyl)oxy)-3-hydroxypropan-2-yl acrylate.

In other additional embodiments, the initial concentration of the CTA in the reaction mixture ranges from about 0.01 millimolar to about 50 millimolar. In yet other additional embodiments, the initial concentration of the CTA ranges from about 0.2 millimolar to about 25 millimolar. In various other embodiments, the CTA is added to the reaction mixture by continuous addition or pulse addition.

In various embodiments, the number of molar equivalents of the CTA added to the mixture ranges from about 0.01 equivalents to about 100 equivalents relative to moles of the late transition metal catalyst. In other various embodiments, the pressure of the reaction mixture ranges from about 15 psi to about 800 psi and the temperature of the reaction mixture ranges from about 0° C. to about 300° C. In yet various other additional embodiments, the semitelchelic or the heterotelechelic polymer has a dispersity ranging from about 1 to about 2.

Results and Discussion

In one disclosed experiment, catalyst 1 and 311 mM (835 equivalents) $HSiEt_3$ in dichloromethane were combined and pressurized to 40 psi of ethylene at room temperature. After 16 hours, GC analysis of the crude mixture showed the catalytic formation of $SiEt_4$ (47 TON), the hydrosilation product of ethylene. A small amount of $SiEt_3$butyl (0.3 TON) was observed, which results from the insertion of two ethylene molecules before silane addition (Scheme 1 below). This successful hydrosilation experiment confirmed that the in-situ formed palladium (II) diimine silyl complex can indeed insert ethylene and thus it was postulated that tertiary silanes could be used as CTAs for palladium (II) diimine-catalyzed olefin polymerizations.

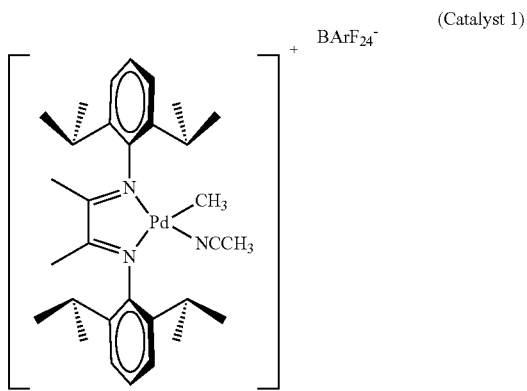

(Catalyst 1)

The main difference between a hydrosilation reaction and a chain transfer polymerization is the number of olefin insertions that occur prior to chain transfer (Scheme 1 below). Therefore, performing the reaction at a lower silane concentration was expected to result in the synthesis of a silane-terminated polyethylene instead of the hydrosilation product. Indeed, a series of polymerizations performed in presence of lower amounts of silane yielded hyperbranched polyethylenes. Molecular weight analysis by gel permeation chromatography of the polymers showed a systematic decrease in the molecular weight with increasing silane concentration and a broadening of the molecular weight distribution (Table 1). It is worth noting that in absence of silane, entry 1, the polymerization is living as illustrated by the narrow molecular weight distribution of the polymer. This means that in absence of chain transfer agent, only one polymer chain is formed per metal center. The large decrease in polymer molecular weight in the presence of silane and only a small decrease in catalyst activity imply that multiple polymer chains are produced per metal center, showing that silane does indeed act as a CTA.

Scheme 1. Proposed Mechanism of Hydrosilation/Polymerization.

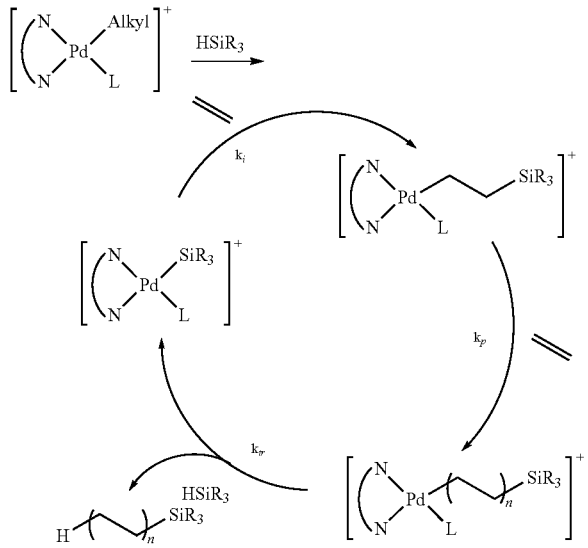

Based on the kinetics of a chain transfer polymerization the degree of polymerization (DP) should follow the Mayo equation (eq. 1) under steady state conditions and in the absence of any other chain termination mechanisms. Here $k_p$ and $k_{tr}$ represent the rate constants for chain propagation and chain transfer, respectively. The order of ethylene dependence for the CTP is not known for this system, and therefore was left to an unknown power of x. Further mechanistic studies were performed, including the ethylene dependency. Nonetheless, by performing all the polymerizations at constant temperature and pressure the [ethylene]$^x$ term is a constant throughout the study.

Theoretical dependence of DP on [Silane]

Equation 1

$$\frac{1}{DP} = \frac{1}{DP_o} + \frac{k_{tr}[\text{Silane}]}{k_p[\text{ethylene}]^x} \quad (\text{eq. 1})$$

Figure 2:
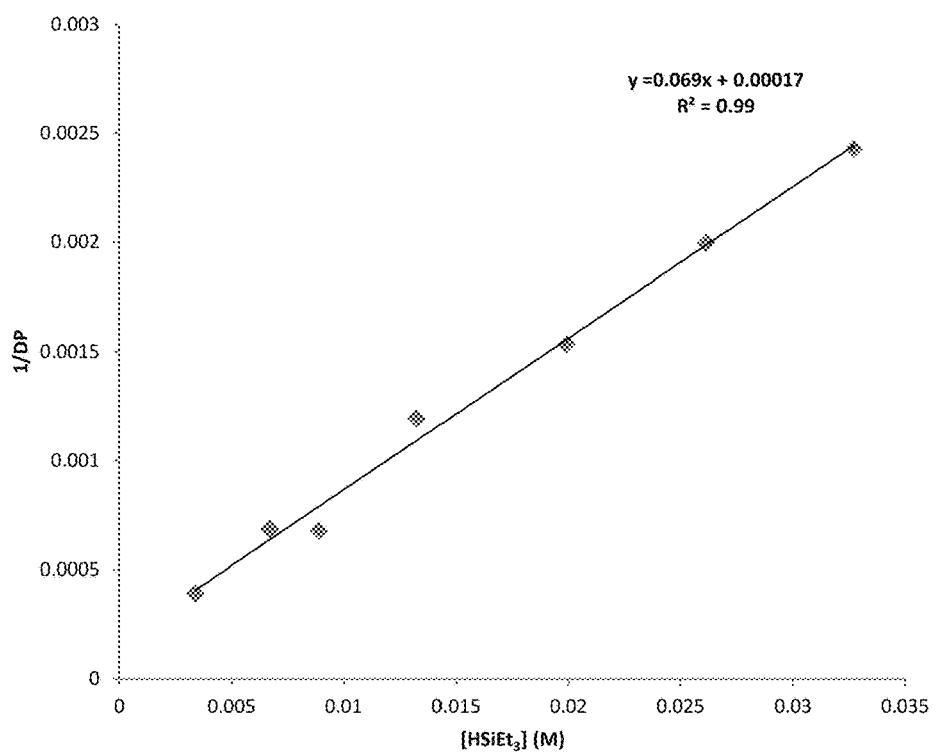
FIG. 2. Relationship between DP and triethylsilane concentration.
Figure 3:
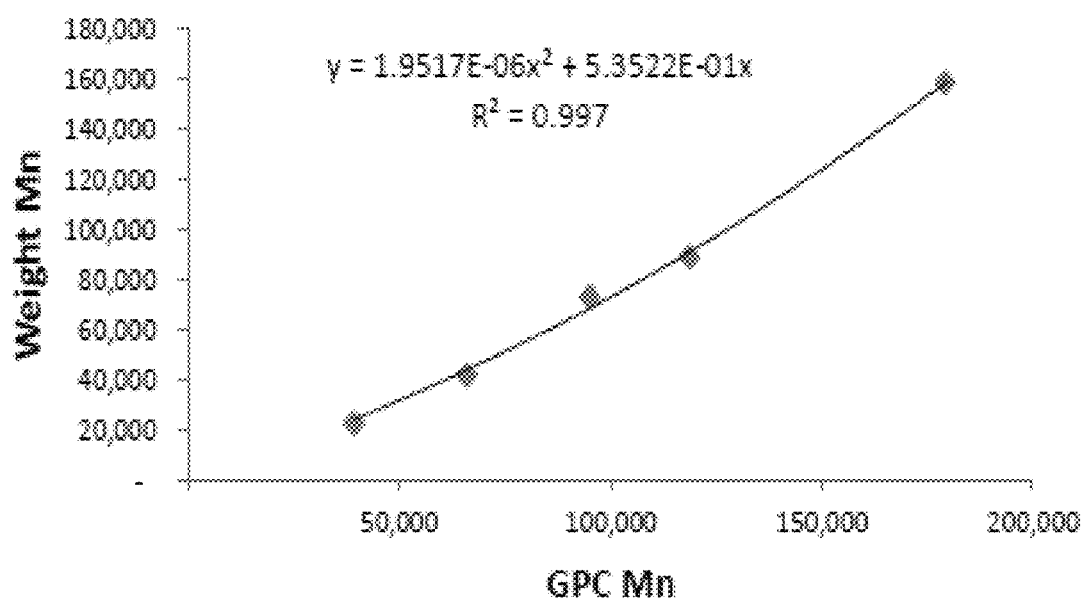
FIG. 3. Calibration curve to relate hyperbranched polyethylene weight $M_n$ to $M_n$ determined from GPC against polystyrene standards.

Applying equation (eq. 1) to the polymerization data presented in Table 1 shows a linear relationship between the inverse of degree of polymerization and the silane concentration as shown in FIG. 2. This confirms that HSiEt$_3$ is a well-behaved CTA under these reaction conditions. Kinetic information about the system can also be determined as the inverse of the slope of the line corresponds to the ratio $k_{tr}/k_p$[ethylene]$^x$~0.069 which suggests that the rate constants of chain transfer and chain propagation are within an order of magnitude. This is significantly different from lanthanide and group IV mediated CTP with silane, where propagation is significantly faster than chain transfer. This is of importance as slow chain transfer requires the use of a larger amount of CTA from which only a small fraction will be consumed.

TABLE 1

Effect of HSiEt$_3$ Concentration on $M_n$ with Catalyst 1[a].

| Entry | HSiEt$_3$ mM | Yield g | TOF[b] h$^{-1}$ | $M_n$[c] g/mol | Đ |
|---|---|---|---|---|---|
| 1 | 0.00 | 2.77 | 354 | 158,700[d] | 1.14 |
| 2 | 3.35 | 2.61 | 331 | 71,900 | 1.49 |
| 3 | 6.68 | 2.47 | 315 | 40,800 | 1.61 |
| 4 | 8.89 | 2.73 | 349 | 41,300 | 1.64 |
| 5 | 13.24 | 2.65 | 338 | 23,500 | 1.50 |
| 6 | 19.89 | 2.23 | 285 | 18,300 | 1.56 |
| 7 | 26.16 | 2.42 | 309 | 14,100 | 1.60 |
| 8 | 32.73 | 2.45 | 311 | 11,500 | 1.85 |

[a]Conditions: 17.5 μmol of catalyst 1; 48 ml chlorobenzene; 5° C.; 200 psi ethylene; reacted for 16 hours.
[b]TOF is based on gravimetric yield of polymer and moles of catalyst used.
[c]$M_n$ was determined by GPC.
[d]$M_n$ was determined based upon polymer yield and moles of catalyst added.

Having established that chain transfer occurs in presence of silane proof was obtained to show that the polymer was indeed silicon end modified. Isolation of the palladium silyl precursor was attempted to showcase that it can perform the living polymerization of ethylene similarly to 1. While the formed palladium silyl complex appears to be stable under polymerization conditions, multiple attempts to isolate and characterize the in-situ made palladium silyl complex remain unsuccessful. At room temperature, the addition of 2 equivalents of HSiEt$_3$ to a dichloromethane-d2 solution of 1 resulted in the detection of methane and partial consumption of 1 as well as in the near quantitative consumption of the silane. The palladium silyl presumably formed could not be detected by $^1$H NMR as it decomposed too rapidly to palladium black. This palladium black is responsible for the catalytic conversion of the HSiEt$_3$ into H$_2$ and Et$_3$Si-SiEt$_3$. (It is important to note that H$_2$ formation is a safety concern as it could result in an increase of the pressure of the reaction vessel). The possibility of H$_2$ formation during the polymerization raised the question of whether silane was the true CTA and if the polymer had the desired silicon end group. Indeed, H$_2$ is a very good chain transfer agent for olefin polymerization and thus in-situ formed H$_2$ during the polymerization could be the culprit for the decrease of molecular weight as a result of the silane addition. The only difference between the product of CTP by H$_2$ and silane is the identity of the end-group. If silane is indeed a CTA then the polyethylene formed should contain a silicon end group. Therefore, analyzing the polymer end-groups proved to be critical. The low molecular weight branched polymer formed could not be easily precipitated and thus separated from Et$_3$Si-SiEt$_3$, a by-product formed after ethylene pressure is released. The $^1$H NMR methylene signals of Et$_3$Si-SiEt$_3$ overlap with the expected $^1$H signals of the PE-CH$_2$—Si(CH$_2$—CH$_3$)$_3$ making assignments problematic. Therefore polymers with a more linear topology were made at higher ethylene pressure as they could be precipitated and thus separated from any undesired silane containing small molecule. A polyethylene made at 400 psi with HSiEt$_3$ was characterized by {$^1$H, $^{29}$Si} gHMBC NMR spectroscopy. Two cross-peaks corresponding to a tetraalkyl silane molecule were detected. While the methyl protons overlapped with the PE signals, the methylene protons of the PE-CH$_2$—Si(CH$_2$—CH$_3$)$_3$ could be detected in the $^1$H NMR at δ=0.52 ppm. The molecular weight of the polymer was determined by integrating this signal versus the protons of the backbone as well as accounting for polymers formed from the initial amount of 1 to give a M$_n$=38,400 g/mol which is in very good agreement with the value determined by GPC=38,900 g/mol, hence confirming that the polymer is indeed silicon end-functionalized.

The tunability and robustness of this chain transfer polymerization technique was demonstrated by varying the substituent groups on the silane. At equal concentration and under identical reaction conditions, various silanes were investigated as shown in Table 2. The decrease of the silane steric bulk, substituting an ethyl group for a methyl group (Table 2 entries 1 vs. 2) led to a faster rate of chain transfer while increasing the steric bulk of the alkyl substituents, substituting ethyl groups for isopropyl groups, led to the complete inhibition of the chain transfer reaction (Table 2 entry 3). The ability to tune the rate of chain transfer through steric variations and concentration of the silane enables a fine control of the degree of polymerization. In Table 2 approximately 15.0% of the HSiEt$_3$ is consumed based on yield and M$_n$, while 25.9% of the faster HSiEt$_2$Me is consumed. This attribute could be of interest in the case of implementing an expensive CTA by minimizing the amount of unreacted CTA. Finally, for the first time alkoxysilane (Table 2, entry 4) could be used as a chain transfer agent, resulting in a PE made via CTP that contains multiple heteroatoms per chain.

TABLE 2

Comparing the Effect of Various Silanes on M$_n$[a].

| Entry | Silane | Yield (g) | TOF[b] h$^{-1}$ | M$_n$[c] g/mol | Đ |
|---|---|---|---|---|---|
| 1[d] | HSiEt$_3$ | 2.65 | 338 | 23,500 | 1.50 |
| 2 | HSiEt$_2$Me | 2.38 | 302 | 13,100 | 1.70 |
| 3 | HSi(ipr)$_3$ | 2.67 | 340 | 179,000 | 1.13 |
| 4 | HSi(OEt)$_3$ | 2.07 | 264 | 51,700 | 1.50 |

[a]Conditions: 17.5 μmol of catalyst 1; 48 ml chlorobenzene; 13.24 mM silane; 5° C.; 200 psi ethylene; reacted for 16 hours
[b]TOF is based on gravimetric yield of polymer and moles of catalyst used.
[c]M$_n$ was determined by GPC.
[d]Included for comparison.

As palladium diimine catalysts are known to copolymerize ethylene and methyl acrylate, an investigation into whether the disclosed chain transfer polymerization system was compatible with the insertion of polar comonomer was sought to further showcase the functional group tolerance of the new chain transfer polymerization method. In a control experiment, ethylene and methyl acrylate (MA) copolymerization yielded a polymer with a M$_n$ of 31,900 g/mol and a dispersity of 1.40 while in the presence of HSiEt$_3$ the M$_n$ decreases to 9,000 g/mol and the molecular weight distribution increased to 1.56 As the TOF decreases somewhat from 141 h$^{-1}$ for the control, to 104 h$^{-1}$ in presence of HSiEt$_3$ this shows the system is still able to perform chain transfer in presence of polar monomer. $^1$H DOSY NMR of the copolymer showed that the silane and acrylate moieties had the same diffusivity coefficient, confirming that the polymer contains both silicon and methyl ester groups. Determination of M$_n$ by NMR gives a value of 8,550 g/mol which is again in good agreement with that determined by GPC. The ability of this system to perform CTP in presence of polar monomers and heteroatoms is a clear advantage of using a LTM over oxophillic catalysts. Interestingly, in this system the decrease in M$_n$ was actually followed by a decrease in the incorporation of MA from 0.7 to 0.45 mol % upon addition of silane. It was hypothesized that this difference is caused by the competition between the coordination of the silane and the methyl acrylate that results in an overall lower acrylate insertion. Higher methyl acrylate incorporation was achieved by lowering the pressure of ethylene. Performing the reaction in presence of silane at 100 psi instead of 200 psi of ethylene gives a copolymer with 0.89 mol % MA with a further decrease in M$_n$ to 4,200 g/mol, however TOF drops significantly to 19 h$^{-1}$. This drop in activity is consistent with the previously reported (J. Am. Chem. Soc. 1998, 120, 888) copolymerization results with the same catalyst.

In conclusion, this disclosure demonstrates the first example of silane as a chain transfer agent for the polymerization of olefin by a cationic palladium (II) diimine catalyst. The rate of chain transfer can be precisely controlled by varying the concentration and substituents of the silane. The merit of using late transition metal catalysts for the polymerization of olefin is their compatibility with heteroatoms. This strength is highlighted by the use of alkoxy silanes as CTA as well as the compatibility of the system to perform ethylene polar monomer copolymerizations. An in-depth kinetic analysis of the rates involved as well as expanding this technique to other late transition metal-based olefin polymerization catalysts is under way.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. General Methods and Materials

All reactions were performed using standard Schlenk line technique under a nitrogen atmosphere; all solvents were dried using a solvent purification system except for chlorobenzene (Aldrich anhydrous 99.8%). All commercially obtained reagents were used as received unless otherwise noted, silanes were degassed by three freeze pump thaw cycles: 2,6-diisopropylaniline (Alfa Aesar); biacetyl (Aldrich); formic acid (Macron); palladium dichloride (J and J materials); 1,5-cyclooctadiene (Acros); tetramethyltin (Acros); ethylene (Airgas Chemically Pure grade); sodium tetrakis[3,5-bis(trifluoromethyl)phenyl]borate (NaBArF$_{24}$, Matrix Scientific) was purified by washing with dichloromethane and dried under high vacuum at 100° C. to remove water; sodium metal (Aldrich); triethylsilane (Aldrich); diethylmethylsilane (Gelest); triethoxysilane (Aldrich); triisopropylsilane (Aldrich); tetraethylsilane (Gelest); chlorotriethylsilane (Oakwood); n-butyllithium (Aldrich); methylacrylate (Aldrich contains 100 ppm MEHQ as inhibitor) was degassed by three freeze pump thaw cycles and used within one week to minimize radical polymerization. The ligand diacetyl-bis(2,6-diisopropylphenylimine), the corresponding diimine palladium methyl catalyst (catalyst 1) and the GC standard Et$_3$SiSiEt$_3$ were synthesized according to known procedures procedures.

$^1$H NMR spectra were recorded on a Varian Unity 500 MHz or Bruker Ascend 500 MHz NMR and are reported in ppm referenced to the residual solvent signal. DOSY NMR as well as {$^1$H, $^{29}$Si} gHMBC were recorded on a Varian Unity Inova 600 MHz NMR equipped with a 5 mm Varian AutoTuneX probe. UV-Vis spectra were recorded using a Cary 50 Bio UV-Vis Spectrophotometer. Mass spectrometry data were taken using a Waters ZMD Quadrupole mass spectrometer. DOSY was run with a gradient duration of 2 ms and a diffusion delay of 500 ms. Gas chromatography was run using an Agilent Technologies 6850 GC equipped with a flame ionization detector. Gel Permeation Chromatography was performed using a Tosoh Ecosec HLC-8320GPC fitted with a reference column (6.0 mm ID×15 cm) a guard column (6.0 mm ID×4.0 cm×5 µm) and two analytical columns (7.8 mm ID×30 cm×5 µm). The reference flow rate is 0.5 ml/min while the analytical column is at 1.0 ml/min. Samples were dissolved in THF HPLC grade (5-10 mg/ml) and filtered through a 0.45 µm PTFE syringe filter. Molecular weights were first determined against polystyrene standards (15 points ranging from 500 M$_w$ to 8.42 million M$_w$) and then analyzed by a second calibration curve to relate M$_n$ determined against polystyrene to M$_n$ determined against known hyperbranched polyethylene standards.
SAFETY WARNING (A steel reactor equipped with a pressure relief valve is preferred over glass because Pd$^0$ catalyzes the transformation of HSiEt$_3$ into H$_2$ and Et$_3$SiSiEt$_3$ of which the pressure increase due to H$_2$ could cause a glass reactor to explode).

All polymerizations were carried out in a stainless steel 200 ml Büchiglasuster miniclave drive reactor. The reactor was dried under vacuum for 2 hours and flushed with nitrogen. A 24 ml solution of triethylsilane in chlorobenzene was syringed into the reactor and cooled to 5° C. using an external cooling unit (Fisher Scientific Isotemp Refrigerated/Heated Bath Circulator). Subsequently 25.0 mg of catalyst 1 in 24 ml of chlorobenzene was syringed into the reactor and immediately pressurized with 200 psi of ethylene with stirring. After 16 hours the ethylene pressure was released and 0.5 ml of triethylsilane was syringed into the reactor to quench the reaction. The solvent was removed in vacuo under heat to give either a black solid or viscous liquid which was further dried under high vacuum at 100° C. Yields were calculated by subtracting out the quantity of catalyst added as well as any remaining solvent or silane as determined by $^1$H NMR.

Example 2. Chain Transfer Polymerization Procedures

Procedure for the Hydrosilation of Ethylene

The hydrosilation of ethylene was also carried out in the stainless steel 200 ml Büchiglasuster miniclave drive reactor. The reactor was dried under vacuum for 2 hours and flushed with nitrogen. Triethylsilane, 1734.3 mg, dissolved in 24 ml of dichloromethane was syringed into the reactor and left at room temperature. Subsequently 25.0 mg of catalyst 1 in 24 ml of dichloromethane was syringed into the reactor and immediately pressurized with 40 psi of ethylene with stirring. After 16 hours the ethylene pressure was released. The solvent was removed in vacuo to give a liquid, which was filtered to remove palladium black.

Procedure for the Synthesis of Et$_3$Sibutyl as a Standard for Gas Chromatography Chlorotriethylsilane, 1 ml, was dissolved in 20 ml of hexanes and 4 ml of 1.6 M n-butyllithium was syringed in. Then 20 ml of tetrahydrofuran was added, at which point a white solid immediately precipitated. The reaction was allowed to stir overnight, filtered and then the solvent was removed in vacuo to give a clear orange oil. This was used without purification.

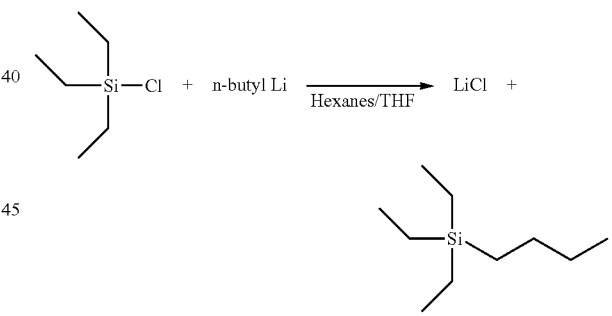

Procedure for the Confirmation that Palladium Black Catalyzes the Formation of H$_2$ and Et$_3$SiSiEt$_3$ from HSiEt$_3$ Palladium black was generated by taking 4.6 mg of catalyst 1 and heating it until it stopped off gassing. The resulting black solid was combined with 0.5 ml of HSiEt$_3$ in air and left to stir overnight. The liquid was then analyzed by GC, which showed the presence of HSiEt$_3$ and Et$_3$SiSiEt$_3$.

Procedure for the Synthesis of Hyperbranched Polyethylene Standards and Calibration of the GPC Hyperbranched polyethylene standards of known molecular weight were synthesized in a similar manner as the general polymerizations, as the catalyst is known to be living in absence of silane. Modifications to the general procedure: catalyst was dissolved in 48 ml of chlorobenzene; no silane was added at the beginning of the reaction, only at the end to quench the reaction. Reaction time was varied to make polymers with different molecular weights. Weight M$_n$ was calculated as grams of polymer formed divided by moles of catalyst added. A calibration curve was constructed by plotting Weight $M_n$ vs GPC $M_n$ from polystyrene standards and fitting a quadratic function to the data.

TABLE 3

$M_n$ of hyperbranched polyethylene standards determined by GPC and weight.

| Time Hours | PDI | GPC $M_n$ g/mol | Weight $M_n$ g/mol |
|---|---|---|---|
| 2 | 1.03 | 39,394 | 22,506 |
| 4 | 1.04 | 66,159 | 42,002 |
| 6 | 1.05 | 95,100 | 73,214 |
| 8.15 | 1.07 | 118,906 | 89,301 |
| 16 | 1.14 | 179,425 | 158,746 |

Procedure for the Synthesis of a Precipitable Polyethylene

Modifications to the general procedure: the ethylene pressure was increased to 400 PSI and 145.3 mg of triethylsilane was used. The polymer was precipitated into acidified methanol of which it eventually collects on the stir bar; this was scraped off and pressed between two watch glasses to remove solvent. The precipitation was repeated for a total of 4 times and the material was dried. Verification of the effectiveness of the precipitation method was done by polymerizing ethylene at 400 PSI in absence of silane until the reactor was opened and then $SiEt_4$ was added, which was then successfully removed by the precipitation method as confirmed by $^1H$ NMR.

Procedure for the Chain Transfer Polymerization of Ethylene with Various Silanes Modifications to the general procedure: triethylsilane was substituted with various silanes (Table 2) and the mass of silane added was changed to maintain a concentration of 13.24 mM of silane in the reactor.

Procedure for the Synthesis of an Ethylene Methyl Acrylate Copolymer

Modifications to the general procedure: 8.26 grams of methyl acrylate was equally divided amongst the solution of silane and catalyst, while adjusting the amount of chlorobenzene solvent to maintain a total volume of 48 ml. No silane was used for the initial copolymer control, while 212.3 mg of $HSiEt_3$ was used for the chain transfer reaction.

Determination of $M_n$ by NMR for Silicon Containing Polyethylene Samples

In order to accurately determine $M_n$ by NMR, one must account for the polymer chains that would have been formed by the initial catalyst 1. This was used to determine $M_n$ by NMR for the polymer synthesized at 400 psi of ethylene as well as the methyl acrylate copolymer. Mol ethylene is defined as the number of moles of ethylene that reacted=polymer yield g/28.05

$$Mn = 28.05 * \left( \frac{\text{mol ethylene}}{\text{mol catalyst 1} + \text{mol ethylene} * \left( \frac{(Si-CH_2)\ \text{area}/8}{PE\ \text{area}/4} \right)} \right)$$

Determination of the Percentage of Silane that Reacted During the Polymerization as Well as the Percentage of Chains that are Silicon End Modified This equation was used to determine the percentage of silane that reacted for HSiEt3 and $HSiEt_2Me$ for Table 2 and Table 4.

$$\% \text{ Silane reacted} = \frac{(\text{polymer yield}/Mn\ GPC) - \text{mol catalyst 1}}{\text{mol Silane added}}$$

This equation was used to determine the percentage of polymer chains that contain a silicon end group in Table 4.

$$\% \text{ polymers with Si end group} = 1 - \frac{\text{mol Pd}}{\text{polymer yield}/Mn\ GPC}$$

TABLE 4

Percent (%) of silane added that reacted.

| Silane | Silane mM | Ethylene psi | % Silane reacted | % Polymer Chains Si end modified |
|---|---|---|---|---|
| $HSiEt_3$ | 3.35 | 200 | 11.6 | 52 |
| $HSiEt_3$ | 6.68 | 200 | 13.4 | 71 |
| $HSiEt_3$ | 8.89 | 200 | 11.4 | 74 |
| $HSiEt_3$ | 13.24 | 200 | 15.0 | 85 |
| $HSiEt_3$ | 19.89 | 200 | 11.0 | 86 |
| $HSiEt_3$ | 26.16 | 200 | 12.3 | 90 |
| $HSiEt_3$ | 32.73 | 200 | 12.4 | 92 |
| $HSiEt_3$ | 26.03 | 400 | 2.6 | 65 |
| $HSiEt_2Me$ | 13.24 | 200 | 25.9 | 90 |

Example 3. Determination of Diffusion Coefficients by $^1H$ DOSY NMR for Silicon Containing Copolymer (Table 5)

TABLE 5

Figure 4:
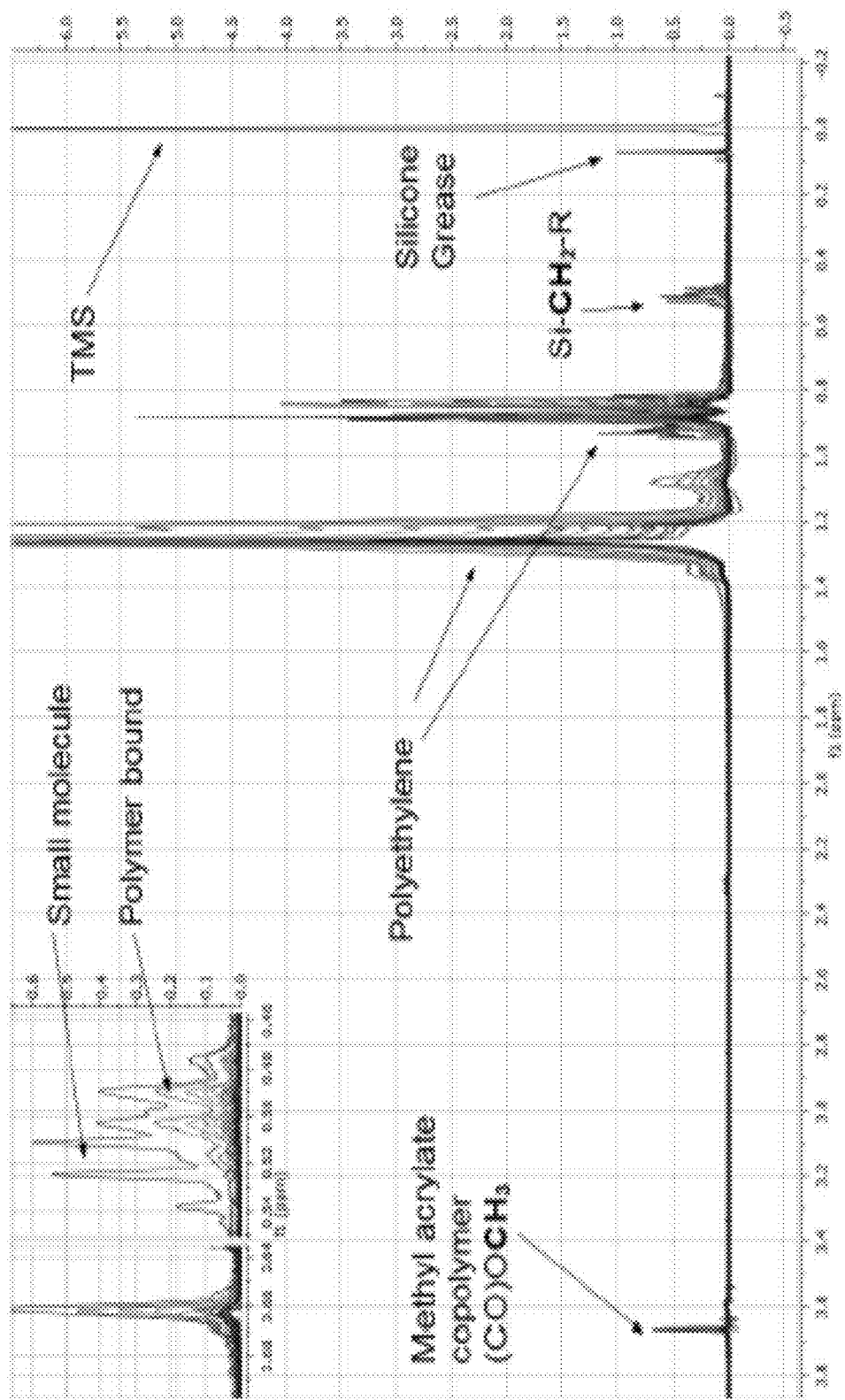
FIG. 4. $^1H$ DOSY NMR of ethylene methyl acrylate copolymer synthesized in presence of $HSiEt_3$ (Si—$CH_2$ is polymer bound). See Table 5.

Diffusion coefficients calculated from DOSY NMR in FIG. 4.

| Peak (ppm) | Diffusion coefficient (m²/s) |
|---|---|
| TMS (separate experiment) | 8.41E−10 |
| Methyl acrylate copolymer $CH_3$ (3.662) | 2.76E−11 |
| Polyethylene backbone (1.258) | 2.74E−11 |
| Polyethylene backbone (0.882) | 2.77E−11 |
| Si—$CH_2$ (0.489) | 3.96E−11 |

Example 4. Preparation of Dye End Capped Polyethylene

Procedure for the Synthesis of a Dye Modified Silane (Scheme 2)

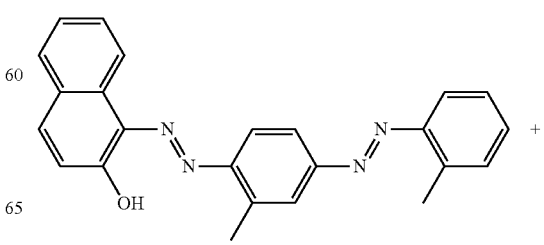

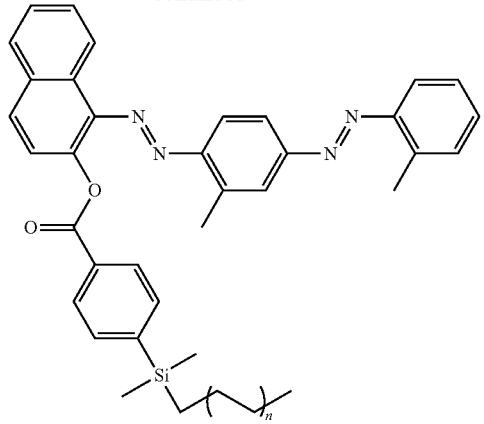

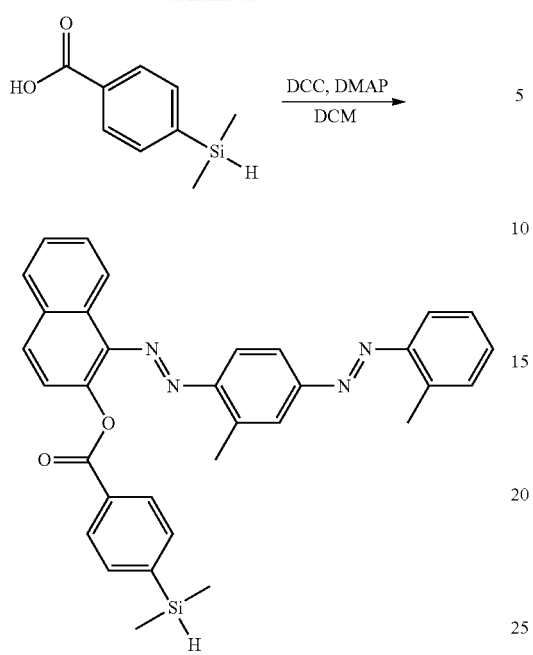

Under water free conditions sudan IV (0.4877 g), 4-(dimethylsilyl)benzoic acid (0.4554 g, synthesized according to literature; *Macromolecules* 2001, 34, 3215), N,N'-24 hours. The solution was filtered and the filtrate isolated, of which the solvent was removed in dichloromethane, 60% hexanes) to give a dark orange solid. Obtained 0.4302 grams (62% yield). $^1$H NMR (CDCl$_3$) σ 8.745-7.275 (m, 17H Ar), 4.482 (sep, J=4 Hz, 1H Si—H), 2.741 (s, 3H Ar—CH$_3$), 2.481 (s, 3H Ar—CH$_3$), 0.394 (d, J=4 Hz, 6H Si—(CH$_3$)$_2$); Mass spec (ESI): M+H Theoretical 543.22 Experimental: 543.5; UV-Vis (DCM) $\lambda_{max}$=385 nm, ε=21,350 cm$^{-1}$M$^{-1}$.

Procedure for the Synthesis of Silane Dye End Capped Polyethylene (Scheme 3)

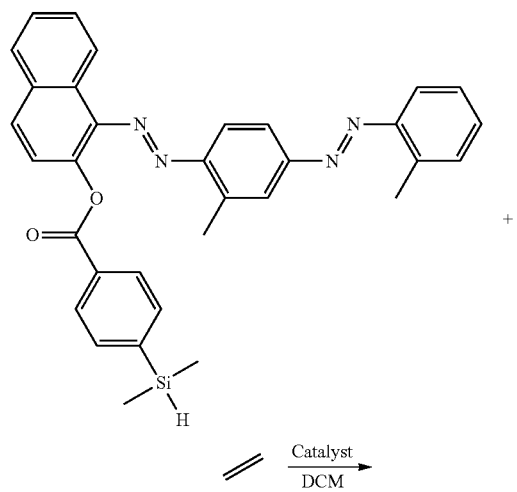

To the reactor was added a cobalt catalyst (CAS#144386-47-0 synthesized according to literature; Organometallics 1992, 11, 3920) (25 mg) solution in DCM and the silane dye (33.6 mg, synthesized above) solution in DCM for a total volume of 50 ml. The reactor was immediately pressurized with 240 psi of ethylene and stirred at room temperature for 3 hours. The ethylene was vented off and the polymerization solution precipitated in 200 ml of methanol. The polymer was isolated via filtration, dissolved in refluxing toluene, precipitated in methanol and isolated via filtration. Obtained 0.3536 g of an orange solid. $^1$H NMR (CD$_2$Cl$_4$+120° C.) σ 8.77-7.21 (m, 17H Ar), 5.058 (d, J=17 Hz, 0.5H C=C—H), 4.996 (d, J=9 Hz, 0.5H C=C—H) 2.776 (s, 1.5H Ar—CH$_3$), 2.594 (s, 1.5H Ar—CH$_3$), 1.358 (s, 13,175H PE CH$_2$ backbone), 0.966 (t, J=7 Hz, 30H PE CH$_3$), 0.370 (m 6H Si—(CH$_3$)$_2$).

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A method for preparing an end-functionalized polyolefin by a chain transfer polymerization (CTP) comprising:
    combining a tertiary silane chain transfer agent (CTA) of formula HSiR$_3$, a late transition metal catalyst, and an olefin, to provide a reaction mixture;
    wherein each R of the CTA is independently an organic moiety, the late transition metal catalyst is substantially non-oxyphilic, the olefin comprises an optional functional group; and
    the rate of the CTP is regulated by the substituents on the CTA, the degree of polymerization (DP) is regulated by the concentration of the CTA in the reaction mixture, and the reaction mixture provides an end-functionalized polyolefin having an end group comprising a silane moiety of formula —SiR$_3$.

2. The method of claim 1 wherein the end functionalized polyolefin is a semitelechelic or a heterotelechelic polymer having a number average molar mass ($M_n$) and a dispersity (D stroke) that is modulated by the substituents on the CTA.

3. The method of claim 2 wherein each substituent R of the silane moiety at one end of the prepared semitelechelic or the heterotelechelic polymer is independently an alkyl, branched alkyl, unsaturated alkyl, cycloalkyl, alkoxy, hydroxy, aryl, heteroaryl, aryloxy, heteroarlyoxy, an oligomer, or polymer, wherein an aryl or heteroaryl moiety is optionally substituted with one or more substituents, and an aryl or heteroaryl moiety is optionally a fused polyaromatic or fused polyheteroaromatic.

4. The method of claim 3 wherein each substituent R of the silane moiety is independently ($C_1$-$C_{10}$)alkyl, O($C_1$-$C_{10}$) alkyl, ($C_3$-$C_8$)cycloalkyl, O($C_3$-$C_8$)cycloalkyl, aryl, O(aryl), heteroaryl, or O(heteroaryl), wherein each aryl or heteroaryl moiety is optionally substituted with one or more of halo, hydroxy, amino, amide, hydrazino, carboxyl, carbonyl, cyano, nitro, alkyl, aryl, or heteroaryl.

5. The method of claim 4 wherein each substituent R of the silane moiety is independently O($C_1$-$C_{10}$)alkyl, O($C_3$-$C_8$)cycloalkyl, O(aryl), or O(heteroaryl), wherein R is optionally a dye or a fluorescent molecule.

6. The method of claim 4 wherein each substituent R of the silane moiety is independently ($C_1$-$C_{10}$)alkyl, ($C_3$-$C_8$)cycloalkyl, aryl, or heteroaryl, wherein R is optionally a dye or fluorescent molecule.

7. The method of claim 6 wherein each substituent R of the silane moiety is independently aryl or heteroaryl.

8. The method of claim 4 wherein each substituent R of the silane moiety is independently methyl, ethyl, isopropyl, cyclopropyl, phenyl, tolyl, methoxy, ethoxy, isopropoxy, butoxy, or phenoxy.

9. The method of claim 1 wherein the late transition metal catalyst comprises palladium, nickel, or cobalt.

10. The method of claim 9 wherein the late transition metal catalyst comprises a monodentate ligand or a bidentate ligand.

11. The method of claim 10 wherein the late transition metal catalyst comprises a diimine, a phosphinosulfonate, or a phenanthroline.

12. The method of claim 10 wherein the olefin comprises an organic functional group.

13. The method of claim 12 wherein the functional group comprises a CN, —C—O—C—, —C(=O)C—, or —C(=O)OC— moiety.

14. The method of claim 10 wherein the olefin is ethylene or an acrylate.

15. The method of claim 1 wherein the initial concentration of the CTA in the reaction mixture ranges from about 0.01 millimolar to about 50 millimolar.

16. The method of claim 15 wherein the initial concentration of the CTA ranges from about 0.2 millimolar to about 25 millimolar.

17. The method of claim 2 wherein the CTA is added to the reaction mixture by continuous addition or pulse addition.

18. The method of claim 17 wherein the number of molar equivalents of the CTA added to the mixture ranges from about 0.01 equivalents to about 100 equivalents relative to moles of the late transition metal catalyst.

19. The method of claim 18 wherein the pressure of the reaction mixture ranges from about 15 psi to about 800 psi and the temperature of the reaction mixture ranges from about 0° C. to about 300° C.

20. The method of claim 19 wherein the semitelchelic or the heterotelechelic polymer has a dispersity ranging from about 1 to about 2.

* * * * *